United States Patent [19]
Frazee et al.

[11] 3,751,154
[45] Aug. 7, 1973

[54] AUTOMATIC RANGEFINDER ELECTRONIC CIRCUITRY

[75] Inventors: Jerome A. Frazee, Palo Alto; Howard E. Murphy, Redwood City, both of Calif.

[73] Assignee: Eastman Kodak Company, Rochester, N.Y.

[22] Filed: July 13, 1970

[21] Appl. No.: 56,196

Related U.S. Application Data

[63] Continuation of Ser. No. 743,370, July 9, 1968, abandoned.

[52] U.S. Cl............ 356/1, 356/4, 250/209, 250/210, 95/44 C
[51] Int. Cl............ G01c 3/00
[58] Field of Search ........ 356/1, 4; 250/209, 250/210; 95/44 C

[56] References Cited
UNITED STATES PATENTS

| | | | |
|---|---|---|---|
| 3,340,400 | 9/1967 | Quittner | 250/210 |
| 3,198,952 | 8/1965 | Benham et al. | 356/1 |
| 3,435,744 | 4/1969 | Stimson | 356/1 |

*Primary Examiner*—Benjamin A. Borchelt
*Assistant Examiner*—S. C. Buczinski
*Attorney*—Robert W. Hampton

[57] ABSTRACT

This invention relates to automatic range finder circuitry for cooperative utilization with apparatus, such as a photographic camera or the like, using triangulation for range distance measurement, and having an automatic range finder mechanism. The apparatus is arranged to sweep a collimated light beam across a plane which includes a subject of interest, and the reflected light returning to the apparatus is imaged on spaced photoelectric transducers differentially connected to produce a varying electrical signal. The range finder mechanism includes a cam adapted to move as a function of the sweeping light beam. When the reflected light falls equally on the photoelectric transducers the range distance has been established.

The present invention supports this apparatus by providing circuitry for detecting the instant that the reflected illumination on the photoelectric transducers is equal, and for providing an output signal which is used to lock the cam against further displacement. The range distance intelligence, defined by the locked cam position, can then be utilized for any convenient purpose.

5 Claims, 6 Drawing Figures

PATENTED AUG 7 1973
3,751,154
SHEET 1 OF 3
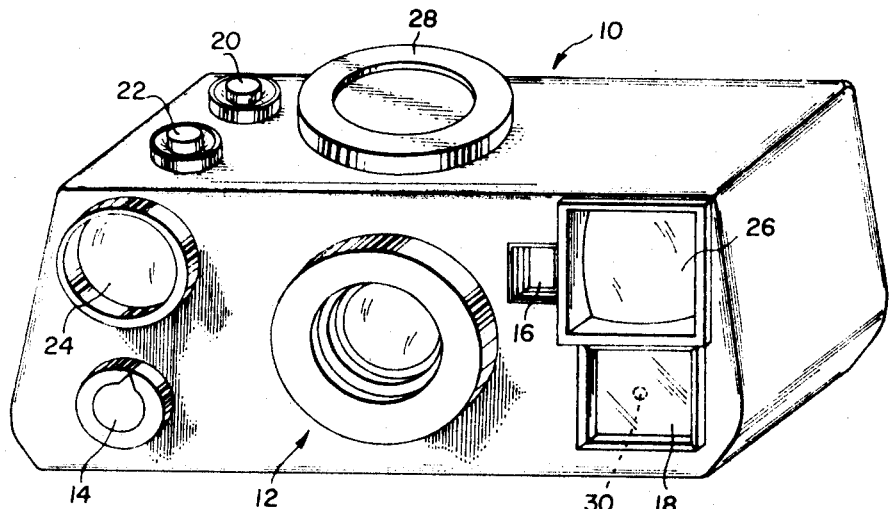
FIG. 1
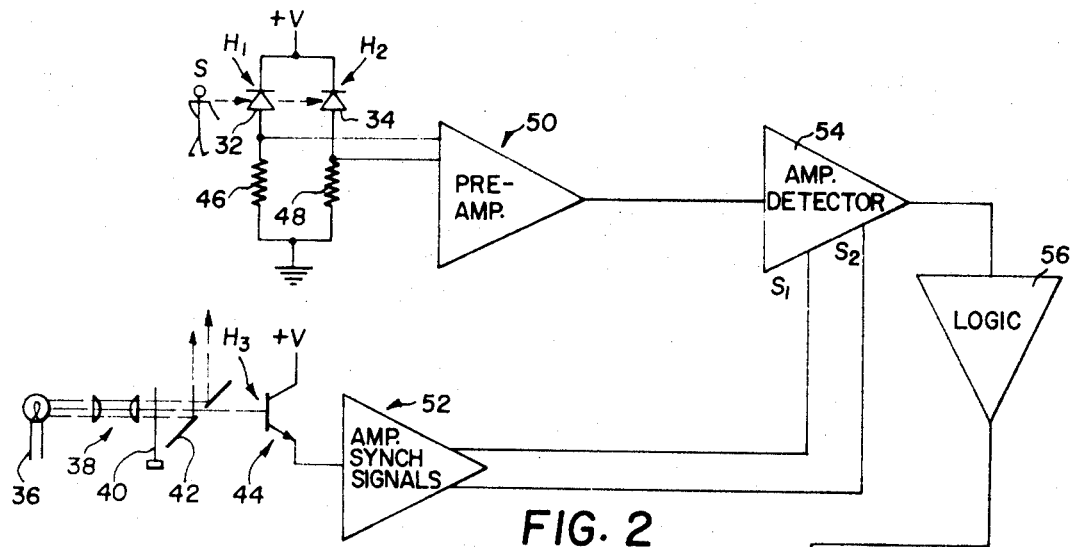
FIG. 2
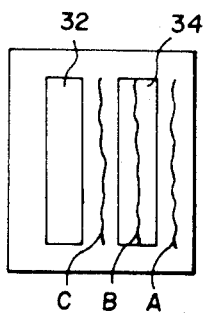
FIG. 3
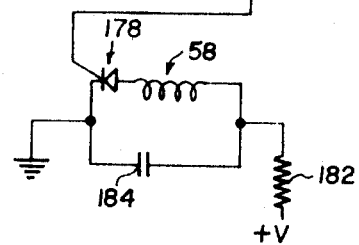
JEROME A. FRAZEE
HOWARD E. MURPHY
INVENTORS
BY James J. Wood
Robert W. Hampton
ATTORNEYS

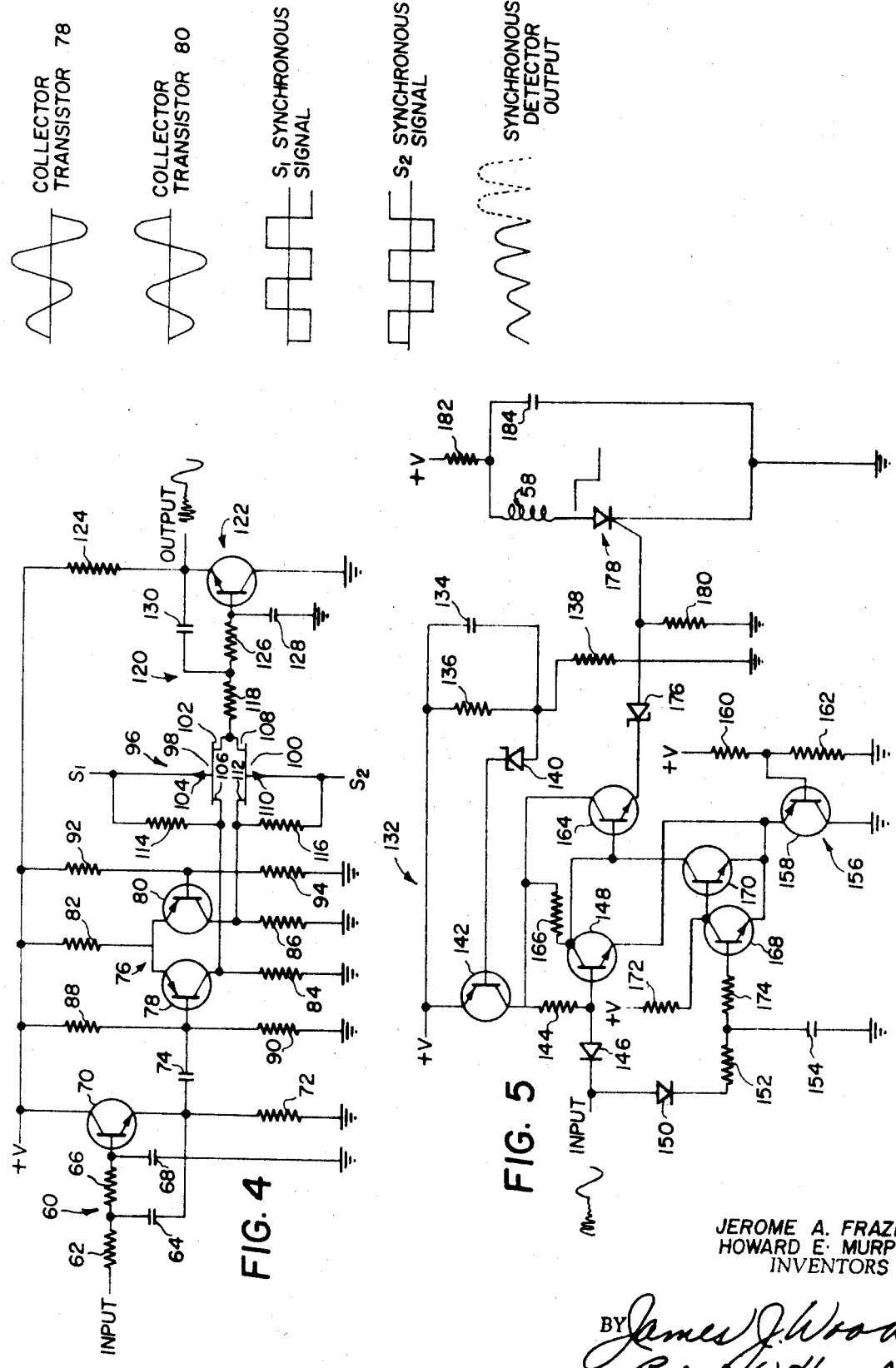

AUTOMATIC RANGEFINDER ELECTRONIC CIRCUITRY

CROSS REFERENCES TO RELATED APPLICATIONS

See copending application for Apparatus Having An Automatic Range Finder Mechanism, Ser. No. 743,471, filed on July 9, 1968, now abandoned, in the name of Donald M. Harvey, and assigned to the same assignee as the present invention.

BACKGROUND OF THE INVENTION

This invention relates to an automatic range finder electronic circuit for use in apparatus wherein a collimated beam of illumination is directed from a source within the apparatus toward a subject about which range distance intelligence is required. The light reflected from the subject is received on spaced phototransducer means for the purpose of determining a null position indicative of the correct range distance. By triangulation concepts, the angle through which the light beam has rotated is a function of the range distance to the subject. A cam means is arranged to move in predetermined displacement as a function of the sweeping light beam. Such an apparatus is described in the copending application for Apparatus Having An Automatic Range Finder Mechanism, Ser. No. 743,471, filed on July 9, 1968 in the name of Donald M. Harvey, and assigned to the same assignee as the present invention.

The present invention supports the copending application cited above by providing an automatic rangefinding electronic circuitry which determines this null position and provides an output signal which is used to lock in the cam means of the apparatus against further displacement. The range distance intelligence is then defined by the locked position of the cam means.

It is known in the art to use photosensitive transducers for rangefinding. U.S. Pat. No. 3,274,914 to Biedermann et al. discloses an automatic rangefinding mechanism for a camera in which two identical photosensitive transducers are utilized to achieve a null indicative of proper range, the null being detected when the electrical resistances of the respective transducers are equal.

U.S. Pat. No. 3,035,176 to Kis et al. relates to a monoscopic range finder for navigation purposes in which the target range is ascertained by causing light from the target to fall on two photocells, one stationery and the other movable. The two photocells, providing differential outputs, are arranged in a bridge circuit, the bridge being arranged electrically to enable the range to be calculated from a balanced condition.

SUMMARY OF THE INVENTION

In cooperation with the apparatus described in the copending application in the name of Donald M. Harvey, cited supra, the circuitry of the instant invention provides first and second photosensitive transducer means arranged in spaced relationship, and adapted to receive reflected amplitude modulated light of a high frequency in the order of 2 kilocycles from a subject at an unknown range distance. The range distance is determined when the total incident radiant energy in both of said photosensitive transducer means is equal. The photosensitive transducer means are connected to differential amplifier means to provide amplified difference a.c. signals which are applied to split phase amplifier means to provide push-pull outputs. Reference signal means provide two synchronous pulse signals, 180° out of phase at the same frequency as the amplitude modulated light. The push-pull outputs and the synchronous pulse signals are applied to a full wave synchronous detector means, to provide an a.c. output signal which has a positive or a negative half cycle depending upon which photosensitive means is then receiving the greater incident radiant energy. The a.c. output signal is applied to logic circuit means which enables zero cross over detection, and provides an output control signal when the a.c. output signal goes through zero and the reflected light is equal on both said photosensitive transducer means.

The novel features of the invention are set forth with particularity in the appended claims. The invention itself, however, both as to its organization and method of operation, together with objects and advantages thereof, may best be understood by reference to the description to follow, considered in connection with the accompanying drawings.

BRIEF DESCRIPTION OF THE DRAWINGS

FIG. 1 is a pictorial view of a photographic camera utilizing the automatic range finder circuitry in accordance with one illustrative embodiment of the invention;

FIG. 2 is an electrical block diagram of the automatic range finder circuitry;

FIG. 3 is a diagram of a pair of photodiodes used in explanation of the operation of the invention, and showing successive image positions moving toward a null position;

FIG. 4 is an electrical schematic of the amplifier-detector portion of the automatic range finder circuit in accordance with the invention;

FIG. 5 is an electrical schematic of the logic portion of the automatic range finder circuitry.

DESCRIPTION OF THE PREFERRED EMBODIMENT

Figure 6:
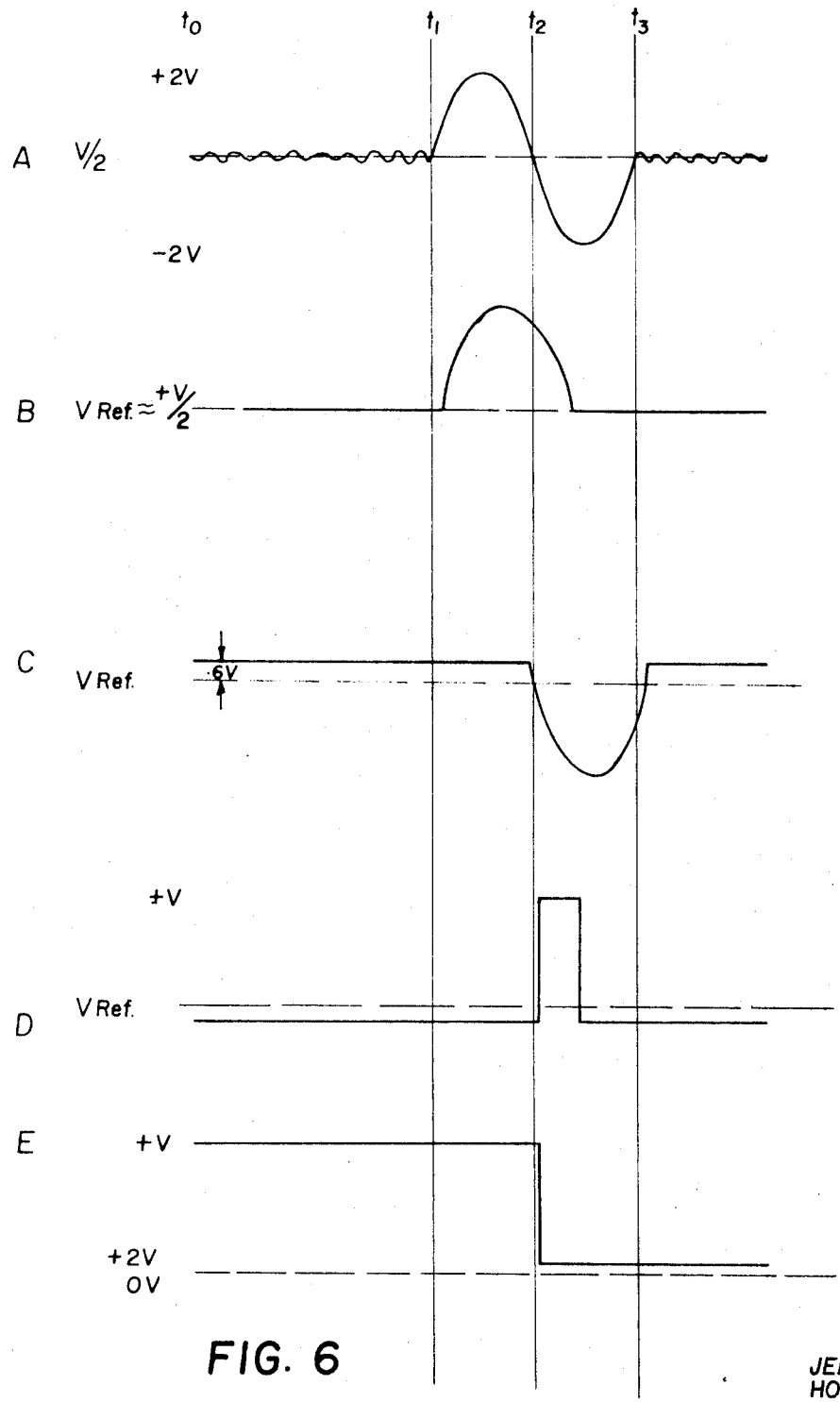
FIG. 6 is a series of electrical wave forms used in explanation of the operation of the automatic range finder circuitry.

Before proceeding with a detailed description of the automatic range finder circuitry, it will be helpful to briefly describe the environment in which the circuitry is intended to operate.

Referring now to FIG. 1, a photographic camera is indicated generally at 10. The principal parts of the photographic camera are: the objective lens indicated at 12, the shutter setting dial 14, the photometric detector 16, the viewfinder 18, focus determining mechanism release member 20, lens/shutter release member 22, transmitting or collimating lens 24, receiving lens 26, winding advance member 28, and transparent dot 30.

The automatic range finder circuitry is contained within the camera and is intended to cooperate with an automatic range finder mechanism described in greater detail in the copending application entitled "Apparatus Having An Automatic Range Finder Mechanism," Ser. No. 743,471, filed on July 9, 1968 in the name of Donald M. Harvey, and assigned to the same assignee as the present invention.

Briefly, both the circuitry and the mechanism operate as follows: The camera operator rotates a lever (not shown) which cocks the automatic range finder mechanism within the camera 10. Next, the operator views the subject to be photographed through the view finder 18, the camera being aimed at the subject to be photographed by moving the camera so as to include the selected subject within the small transparent dot 30. While the camera is held in this position, the correct range setting is obtained; however, it should be clearly understood at this point that by obtaining the range setting for a particular subject, this will not dictate the final composition of the scene, which is still subject to personal selection by the camera operator. For example, the subject as seen in the viewfinder, may be conveniently placed either left or right of center as well as in the center of the viewfinder 18, so as to encompass any desired background, disregarding the presence of the transparent dot 30.

Next, the focus determining mechanism release member 20 is depressed; this uncocks the automatic range finder mechanism within the camera 10, energizing a light source and also electrically completing the energizing circuit for the automatic range finder circuit as will be later explained.

A beam of collimated light is now sent out through the transmitting lens 24. The collimated beam sweeps from right to left (oriented from the viewpoint of the camera operator) and an image of the filament of the lamp contained within the camera is successively reflected back to the receiving lens 26. As the beam of light sweeps the field, a cam means (not shown) is displaced from a hyperfocal position, through successively and progressively smaller range distance positions. When the automatic range finder circuitry detects a null, as will be explained more fully, it develops an output signal current to energize a solenoid, which by its plunger forces a pawl into locking engagement with a ratchet wheel sector on the cam means, locking the cam means against further displacement as explained in the copending application cited supra. The cam means is now fixed in position at the correct range setting. The camera user is now free to move the camera 10 from side to side so as to include any background desired. When satisfied, the camera operator then depresses the lens/shutter release member 22, which has the effect of moving the objective lens 12 from its rest position to the stop afforded by the cam means now resting at the correct range; somewhat later in time after the objective lens 12 has been moved, the shutter blades are actuated to admit light through the objective lens 12.

It should be noted that the inventive concept may be used in any apparatus which can utilize the range intelligence afforded by the cam means in its arrested position. Stated differently, any utilization means may be used in place of the camera objective lens 12.

The overall role of the circuitry is shown in block diagram in FIG. 2. Behind the receiving lens 26, a pair of photosensitive transducers are arranged in spaced relationship. In the illustrative embodiment of this invention, these transducers are a pair of photodiodes 32,34 (FIGS. 2 & 3) spaced about 2 mils apart. The photodiodes 32,34 receive all the radiant energy passed by the receiving lens 26. The total incident radiant energy is measured in power per unit area and is indicated by the symbol H. In FIG. 2, the total incident radiant energy on diodes 32,34 is $H_1$ and $H_2$, respectively. A light source 36 within the camera 10 is passed by a lens system indicated generally at 38, and is then modulated by any convenient means such as a mechanical chopper 40, vibrating at one kilocycle per second, before passing on to a pivoting mirror 42. The modulated light, after passing through a hole in the mirror 42, is caused to fall on a photosensitive transducer, which may be a phototransistor 44, to provide a pair of synchronous reference signals, $S_1, S_2$. The total incident radiant energy on phototransistor 44 is identified as $H_3$.

The action of semiconductor photodiodes is well known in the art. Briefly, a reverse voltage is applied to the PN junction, and the holes and electrons created near the junction by the incident light energy are attracted in the opposite direction to form a current which flows out through the load resistors 46,48 to produce an output signal. The higher the intensity of the light, the higher will be the current flow. The pivoting mirror 42 sends out a beam of light through the transmitting lens 24 (FIG. 1) toward the subject S (FIG. 2). An image of the filament of lamp 36 is then successively received by the receiving lens 26 (FIG. 1). As the image of the lamp filament moves successively from the positions A,B, etc., (FIG. 3), one photodiode will receive more light than the other, and hence a greater current will flow through its corresponding load resistor. The automatic range finder circuitry is arranged so that when the filament image is substantially between the photodiodes 32,34, (as shown in FIG. 3) the light incident on the photodiode pair will be equal, and the range distance to the subject S is then established by triangulation, knowing the angle through which the light beam has rotated by means of mirror 42, and one side of the triangle established by virtue of the fixed distance between the transmitting lens 24 and the receiving lens 26. In the illustrative embodiment, this distance is about 4 inches.

The signals developed across the load resistors 46,48 are applied to a preamplifier indicated generally at 50. The preamplifier 50 includes a differential amplifier which measures the difference between the currents created in each of the photodiodes 32,34, and since it is the difference which is amplified, the current existing in both resistors 46 and 48 by virtue of the ambient illumination will be substantially eliminated.

The phototransistor 44 is a junction transistor arranged so that the light can flow on the structure near the collector junction, the action of the light increasing the current through the reverse bias collector junction. With the base terminal of the transistor left open circuited, the increase of current is amplified by the phototransistor 44 resulting in a higher collector current.

The reference signal photocurrent of the phototransistor 44 is applied to the synchronous signal amplifier indicated generally at 52 to derive synchronous reference signals $S_1, S_2$. Since the amplitude of displacement of the chopper has the overall envelope of a damped sinusoidal wave, various harmonics are generated. The amplifier 52 includes high and low pass filters which eliminate most of the components of modulation except a substantially 2 kilocycle signal, so that the amplifier 52 develops well shaped rectangular synchronous pulses.

The output of the preamplifier 50 is fed to an amplifier-detector 54 as are the synchronous signals $S_1, S_2$, provided by amplifier 52. The amplifier-detector output, after low pass filtering is a voltage, (FIG. 6A) which is zero when the circuitry is balanced by the reception of equal signal illumination by photodiodes 32,34 (FIG.

3:C), and swings + or − depending upon which one of the photodiodes receives more radiation.

This voltage signal is applied to logic circuitry 56 which provides a trigger output control signal at the time of zero crossover of the voltage signal (FIG. 6A), the trigger output control signal energizing a solenoid indicated generally at 58, the energization of the solenoid causing its plunger to actuate a pawl-ratchet mechanism to lock the cam means against further displacement.

The range distance has now been determined and this range intelligence may be used by any utilization means. In the embodiment here illustrated, the utilization means is the objective lens 12; when the lens/shutter release member 22 is actuated, the camera objective lens 12 is displaced until it is itself stopped by the arrested cam means and therefore it is at the correct focal setting for the range distance to the subject S.

The amplifier detector circuitry of FIG. 4 will now be described in greater detail. As previously indicated, the automatic range finder circuitry is energized by a source within the camera, and in the illustrative embodiment selected, this source is a 15 volt battery. The energization takes place by the mechanical closing of a switch which completes the negative side of the circuitry to ground. The output of the preamplifier 50 is applied to a high-pass filter 60 which comprises two high-pass RC sections 62,64 and 66,68 respectively connected as shown. The RC sections are connected to a NPN transistor 70, transistor 70 having its collector connected to +V and its emitter connected to ground through resistor 72. The output of the transistor 70 is connected through a coupling capacitor 74 to a phase splitting amplifier indicated generally at 76. The phase splitting amplifier 76 comprises PNP transistors 78,80, having their emitters connected in common to a source of potential +V through a resistor 82. The output of the phase splitting amplifier 76 is developed across collector resistors 84,86.

The biasing potential for the base of transistors 78, 80 is established by means of the voltage dividing action afforded by resistors 88,90;92,94, respectively.

The outputs from the amplifier 76 are applied to a synchronous detector means indicated generally at 96.

The synchronous detector means 96 here comprises two field effect transistors (FET) 98,100. The FETS are used here for commutator switch action. The FET 98 has a drain 102, a gate 104, and a source 106. The FET 100 has a drain 108, a gate 110, and a source 112; feed back resistors 114,116 are connected between the gate and source of FET 98 and FET 100, respectively. The gates 104 and 110 are connected as indicated to receive signals $S_1$ and $S_2$ of the synchronous signal amplifier 52.

The output of the synchronous detector 96 is applied through resistor 118 to an active low pass filter circuit indicated generally at 120. The low pass filter circuit 120 includes NPN transistor 122 connected in the common collector configuration, having its emitter connected to +V through a resistor 124. A resistor 126 is connected to the base of transistor 122 and serially with resistor 118; capacitor 128 is connected between the base of transistor 122 and ground. A feedback capacitor 130 is connected between the emitter and the mid-point of the resistors 118,126.

The logic circuitry 56 is shown in greater detail in FIG. 5. A hold-off circuit is indicated generally at 132.

This latter circuit comprises capacitor 134, resistors 136 and 138, zener diode 140, and PNP transistor 142. The capacitor 134 is arranged in shunt with resistor 136 and is connected to ground through resistor 138. The zener diode 140 has its cathode connected to the base of a PNP transistor 142 and its anode connected to the mid-point of the serially connected resistors 136,138. The PNP transistor 142 has its emitter connected to the +V supply and its collector connected to a resistor 144.

A diode 146 has its anode connected to the base of a NPN transistor 148 and its cathode connected to the emitter of transistor 122, which is the input of the logic circuit. A diode 150 has its anode connected to the input and its cathode connected to ground through the serial combination of resistor 152 and capacitor 154.

The transistor 148 has its emitter connected to a potential source $V_{ref}$, indicated generally at 156. This is a voltage regulated circuit comprising a PNP transistor 158 having its base connected to the mid-point of serially connected resistors 160,162, the serial combination being connected between +V and ground. The collector of transistor 158 is grounded, and the emitter is connected to the emitter of transistor 148 as may be seen in FIG. 5. The collector of transistor 148 is connected to the base of a NPN transistor 164 and to the collector of transistor 142 through resistor 166.

A pair of NPN transistors 168,170 have their emitters connected in common and to the source of potential $V_{ref}$ 156. The base of transistor 170 is connected to the collector of transistor 168, the collector of transistor 168 being connected to +V through a resistor 172. The base of transistor 168 is connected to a resistor 174 and to capacitor 154 as indicated, while the collector of transistor 170 is connected to the base of transistor 164 and to the collector of transistor 148. The emitter of transistor 164 is connected serially with a zener or avalanche diode 176, the zener diode 176 having its cathode connected to the emitter of transistor 164 and its anode connected to the gate electrode of a silicon control rectifier (SCR) 178. The anode of the zener diode 176 is also connected to ground through a resistor 180.

The SCR 178 is arranged serially with the coil of the solenoid 58. The solenoid 58 is connected to +V through a resistor 182. A capacitor 184 is connected in parallel with the solenoid 58 and the silicon control rectifier 178, as shown.

OPERATION OF THE CIRCUITRY

By way of review, when the camera user wishes to take a picture, the camera 10 is aimed at the subject S of interest, the subject S being viewed through the viewfinder 18 (FIG. 1) with the transparent dot 30 being aimed at the subject. The transparent dot 30 is in alignment with the spacing between the photodiodes 32,34. The focus determining mechanism release member 20 is depressed. The automatic range finder circuit is then energized by the closing of a switch within the camera which electrically completes the circuit to the negative side of the range finder circuitry, and a collimated beam of light is sent out through the transmitting lens 24. The light reflected back is received through the receiving lens 26 and focused on the photodiodes 32,34. The light beam continues to sweep through an angle and effectively, an image of the lamp filament 36 is received by the receiving lens 26, and is imaged successively at positions A,B,C. (FIG. 3) At position A, the lamp filament energy has substantially no effect on the diodes 32,34, but in position B the photodiode 34 will receive more incident radiation and hence, a greater photocurrent will flow.

The high frequency light is used to improve the signal to noise ratio of the useful signal, the noise encountered under environmental conditions being principally low frequency — 60 Hz and 120 Hz — contributed by fluorescent illumination.

The photocurrent generated in the photodiodes 32,34 is essentially alternating because of the on and off nature of the modulated light. Also, as the light beam sweeps across a diode, the photocurrents are less at the physical edge of the diode, are at a maximum in the center of the photodiode, and diminish as the light beam begins to leave the diode surface. Thus, the photocurrents are alternating and varying in amplitude.

The beam of light transmitted by the transmitting lens 24 is also chopped or modulated by chopper 40 within the camera, and the modulated light is applied to a phototransistor 44, the pulsating incident radiation produced by the light on phototransistor 44 causing it to develop more or less photocurrent.

Since the same modulating light that sweeps across the photodiodes 32,34 is also applied directly to the phototransistor 44, as we shall see, this provides a means for providing synchronous signals, $S_1, S_2$.

The modulating light falling on phototransistor 44, and the alternating current which is generated, is applied to amplifier 52, where both high and low pass filtering provide substantially 2KHz to insure that the synchronizing pulses will have high rise and fall times, that is, they will be highly rectangular pulses. The synchronous pulse signals $S_1, S_2$, from the amplifier 52 are derived from the collectors of two grounded emitter transistors which are each alternately cut off and conducting, the voltage respectively swinging from +V to some negative potential, to produce the synchronous signals $S_1$ and $S_2$ as shown in FIG. 4.

The photocurrents developed by the photodiodes 32,34 are applied to a differential amplifier within the preamplifier 50; the differential amplifier provides rejection of common mode signals generated by ambient illumination. The difference photocurrent then passed by the differential amplifier is applied to a high pass filter circuit 60 and is then sent through the coupling capacitor 74 to the phase splitting amplifier 76, which at its respective collectors provides two voltages of opposite phase.

As indicated above, the signal across, for example, the photodiode 34 will be alternating in nature because of the ON and OFF nature of the light. In order to improve the received signal, it is desirable to use both the positive and negative excursions of this alternating photocurrent signal. This alternating signal is split up at the collectors of the transistors 78 and 80 to provide signals which are out of phase as shown to the right in FIG. 4.

Note: For simplicity of explanation, these alternating signals have been shown as sine waves, but it will be appreciated that the actual signal, although alternating in nature, is much more complex.

The collectors of transistors 78,80 are connected directly to the source 106,112 of the synchronous detector 96. The gates 104,110 of the detector 96 are connected to receive the synchronous reference signals $S_1$ and $S_2$, respectively. The source 106 and 112 are connected to the collectors of the amplifier 76 so that their voltage changes take the same excursions as appear across resistors 84,86. Effectively, the P channel FET 98,100 act as a single pole double throw switch.

Referring now to the waveforms shown in FIG. 4, when $S_1$ or $S_2$ is at +V, the FET to which it is connected 98 or 100 is pinched off, while when $S_1$ or $S_2$ is at a negative potential, the signal then appearing at source 106,112 will pass through to the active low pass filter circuit 120. As indicated in the waveform for the synchronous detector output (FIG. 4) this means that both positive and negative signal excursions are passed by means of the gating action of $S_1$ and $S_2$. In FIG. 4, only a few cycles are shown, but it will be appreciated that the incremental additions are many, building up to a peak waveform and then declining toward zero as the light beam leaves diode 34 and begins to sweep across diode 32. Arbitrarily in the situation selected for illustration, the waveform for photodiode 34 is a positive going voltage. Similarly in the same manner as described above, as the light beam sweeps across diode 32, the synchronous signals $S_1$ and $S_2$ provide the very same gating action to develop a negative going voltage.

The voltage is applied to the low pass filter 120 and the output is taken between the emitter of transistor 122 and ground. In FIG. 6A, there is shown the voltage wave form which appears at the emitter of the transistor 122. It is this voltage which will be the input to the logic circuitry 56. (FIG. 5)

Referring now to FIGS. 5 and 6, when the switch within the camera is closed to energize the automatic range finder circuitry, there is a delayed application of the energizing potential by the hold-off circuit 132 to prevent spurious actuation of the SCR 178 by transients in the circuit. Accordingly, upon the closing of the switch, a finite time is required to charge capacitor 134, determined by the RC time constant (resistor 138 and capacitor 134). When the capacitor reaches the avalanche potential of the zener diode 140, it goes into the avalanche mode, permitting transistor 142 to conduct, effectively energizing the logic circuitry.

During the time interval $t_0$ to $t_1$, the signal is mostly random noise within the system.

A summary of the transistor conditions during the interval $t_0$ to $t_1$ will aid in our understanding:

Transistor 142 is ON.
Transistor 148 is ON.
Transistor 164 is ON.
Transistor 168 is OFF.
Transistor 170 is ON.
Zener diode 176 is operating in the avalanche mode.
SCR 178 is cut off and its anode is at +V.

It will be helpful to examine more closely what is happening in the interval $t_0$ to $t_1$, in order to appreciate the actual working of the circuitry. Between the time $t_0$ to $t_1$, the capacitor 154 (FIG. 6B) is charged to approximately the voltage $V_{ref}$. The charging path may be traced +V, transistor 142, resistor 144, diodes 146,150, resistor 152, capacitor 154 to ground.

The transistor 148 is ON, and its base potential shown in FIG. 6C is approximately 0.6 volt higher than its emitter, which is at $V_{ref}$. The transistor 164 is ON, because its base is approximately at $V_{ref}$, while its emitter is below that potential, because of the zener diode pulling it down to the avalanche potential. (See FIG. 6D.)

The anode of the silicon control rectifier (SCR) 178 is at +V, FIG. 6D, since it is cut off, the gate electrode being at the avalanche potential set by the zener diode 176.

Assume now that the lamp filament is imaged at position B, FIG. 3, and a positive voltage wave form appears in the interval $t_1 - t_2$ (FIG. 6A). As the image of filament moves progressively across from B to C, the signal begins to diminish and finally at position C, (FIG. 3) the voltage wave form goes through zero. (FIG. 6A) This signal between $t_1$ and $t_2$, which is considerably higher than the no signal noise voltage, charges the capacitor 154 toward a higher potential as indicated in FIG. 6B. Since the base of transistor 168 is connected to one side of the capacitor 154, the transistor 168 now turns on, shutting off transistor 170, since its base is now at $V_{ref}$. As the signal in FIG. 6A goes through zero, the capacitor 154 keeps the transistor 168 ON for a time determined by the RC time constant, which is defined by magnitudes of resistor 174 and the capacitor 154 itself. As the signal (FIG. 6A) moves through zero, at time $t_2$, transistor 148 turns OFF, and its voltage begins going negative, as shown in FIG. 6C.

Now, since the transistor 168 is saturated, and since the transistor 148 has turned off, the base of transistor 164 moves toward +V; the emitter follows the base and positive going pulse (See FIG. 6D) is transmitted through the avalanche diode 176 to the gate electrode of SCR 178, causing it to conduct. The SCR responds rapidly, as shown in FIG. 6E. The solenoid 58 now conducts, actuating a plunger, which cooperates with an accompanying pawl and ratchet wheel arrangement to arrest further displacement of the cam means within the camera. Effectively, the range distance has been determined. The camera user may now arrange the scene in any way he wishes to include more or less background in the final picture, which is to be taken. When he is satisfied that the scene is properly framed, the user depresses the lens shutter release member 22 which first displaces the objective lens 12 toward the stop provided by the arrested cam means and then actuates the shutter blade to admit light into the camera.

As previously indicated, once the cam means has been arrested, the range distance is established and any other utilization means (other than an objective lens 12) may be employed to make effective use of the range distance intelligence thus established.

The invention has been described in detail with particular reference to preferred embodiments thereof, but it will be understood that variations and modifications can be effected within the spirit and scope of the invention, as described hereinabove, and as defined in the appended claims.

We claim:

1. In a triangulation rangefinding apparatus for receiving light modulated at a selected frequency and reflected from a subject spaced from the apparatus whose distance from the apparatus is to be determined and including first and second, spaced photosensitive means for receiving varying intensities of the reflected light, the distance between the apparatus and the subject being determined when the reflected light received on both said photosensitive means is substantially equal, the combination comprising:

a. a difference amplifier connected to said first and second photosensitive means for providing a first difference signal;
b. a push-pull amplifier responsive to said first difference signal for providing push-pull output signals;
c. reference signal means for providing two synchronous pulse signals 180° out of phase and at the selected frequency at which the light is modulated;
d. detector means responsive to said push-pull output signals and said two synchronous pulse signals for providing a second signal, said second signal having a waveform characterized by a relatively positive half cycle when the first photosensitive means receives more reflected light than the second photosensitive means and a relatively negative half cycle when the second photosensitive means receives more reflected light than the first photosensitive means; and
e. crossover means responsive to said second signal for detecting when said waveform changes from one half cycle to the other and for generating an output control signal indicative of said changeover.

2. The invention as set forth in claim 1 wherein the first photosensitive means includes a first photodiode and the second photosensitive means includes a second photodiode.

3. The invention as set forth in claim 1 wherein said reference signal means comprises a phototransistor and dual cooperating transistors, said phototransistor being exposed to light amplitude modulated at the same selected frequency as said reflected amplitude modulated light, the photocurrents produced by said phototransistor being coupled to said dual cooperating transistors to produce alternate ON or OFF operation for each of said cooperating transistors to provide said two synchronous pulse signals.

4. The invention as set forth in claim 1 wherein said detector means comprises two field effect transistors each having a source, a gate, and a drain, the respective sources being connected to receive said push-pull outputs, the respective gates being connected to receive said synchronous pulse signals, the drains being connected in common to provide said second signal.

5. The invention as set forth in claim 1 wherein said crossover means comprises a first transistor, a second transistor, zener diode means, and a controlled rectifier means having a gate electrode, said first transistor means being connected in the common emitter configuration having its base responsive to the voltage excursions of said second signal, said second transistor being connected as an emitter follower having its base connected to the collector of said first transistor and its emitter connected to said zener diode means, said zener diode means being connected to said gate electrode, whereby when said waveform crosses from one half cycle to the other, said output control signal is applied to said gate electrode.

half cycle to the other, said output control signal is generated by said rectifier means.

* * * * *